Jan. 19, 1954  P. T. NIMS ET AL  2,666,492
ELECTROMECHANICAL CHANGE-SPEED TRANSMISSION
AND BRAKE CONTROL FOR VEHICLES
Original Filed Jan. 23, 1948  7 Sheets-Sheet 5

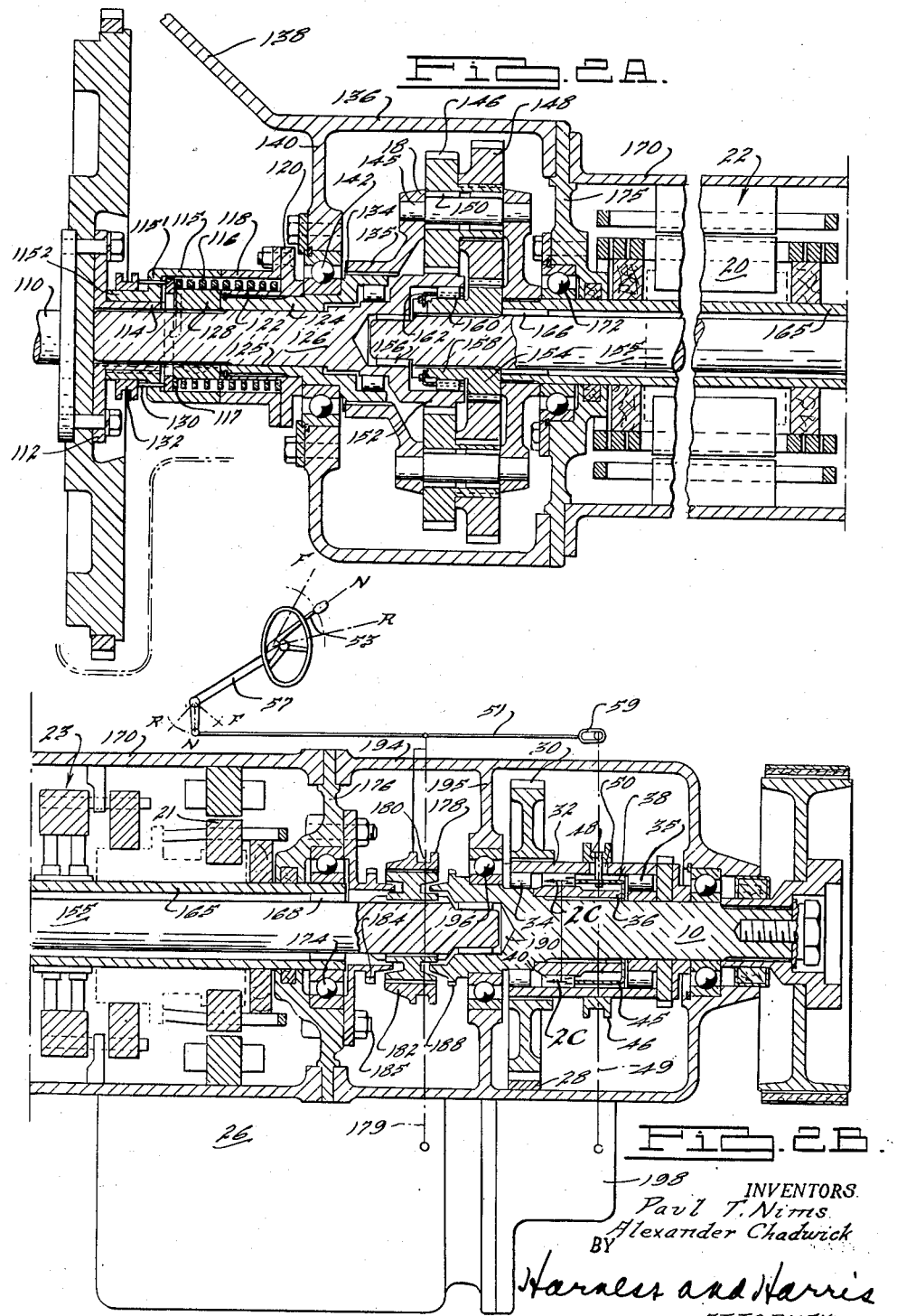

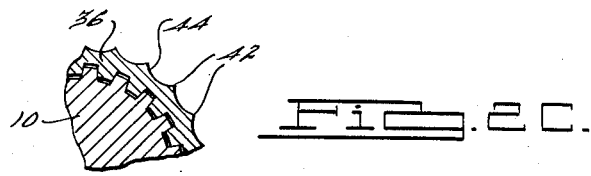
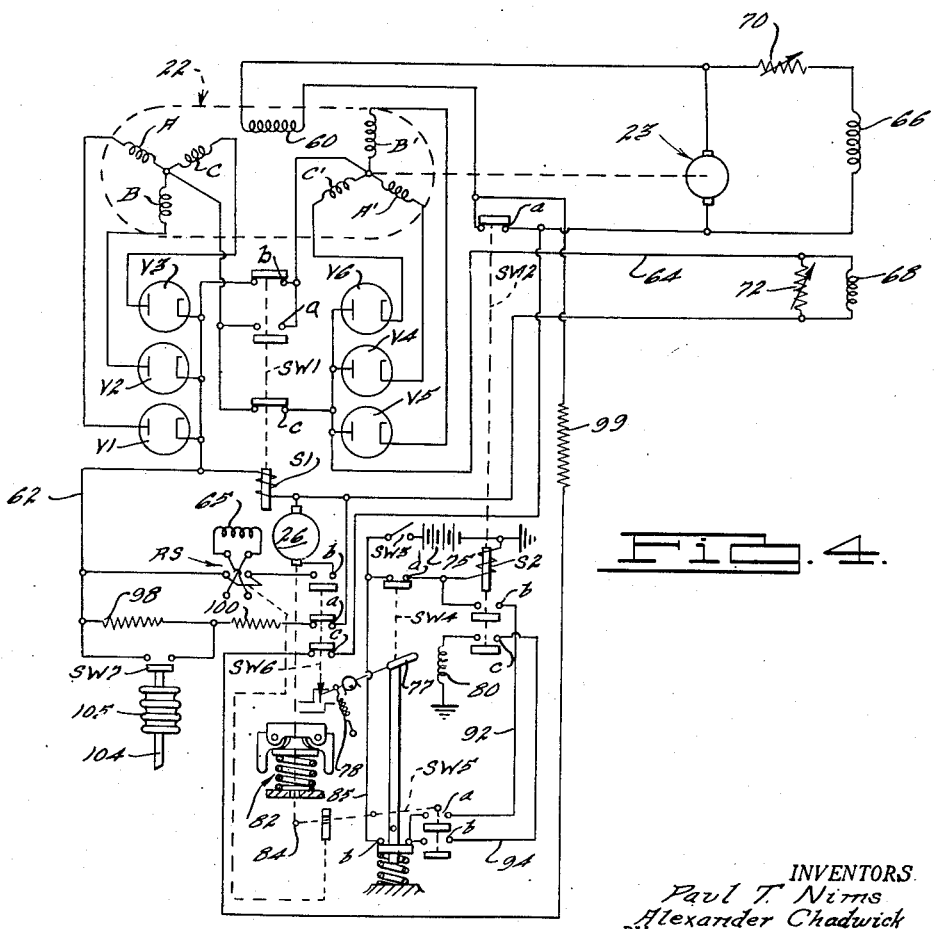

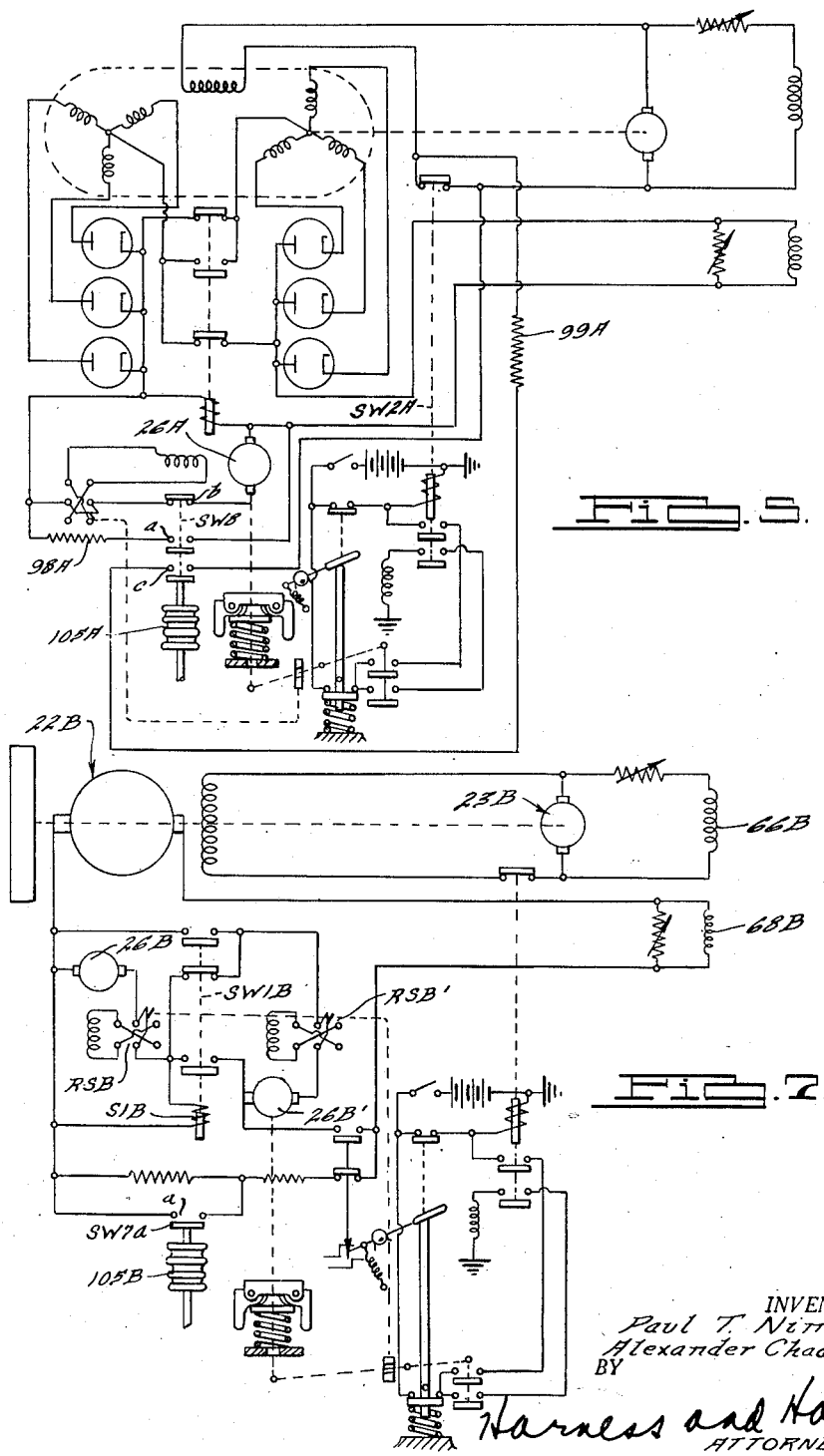

INVENTORS.
Paul T. Nims.
Alexander Chadwick
BY
Harness and Harris
ATTORNEYS

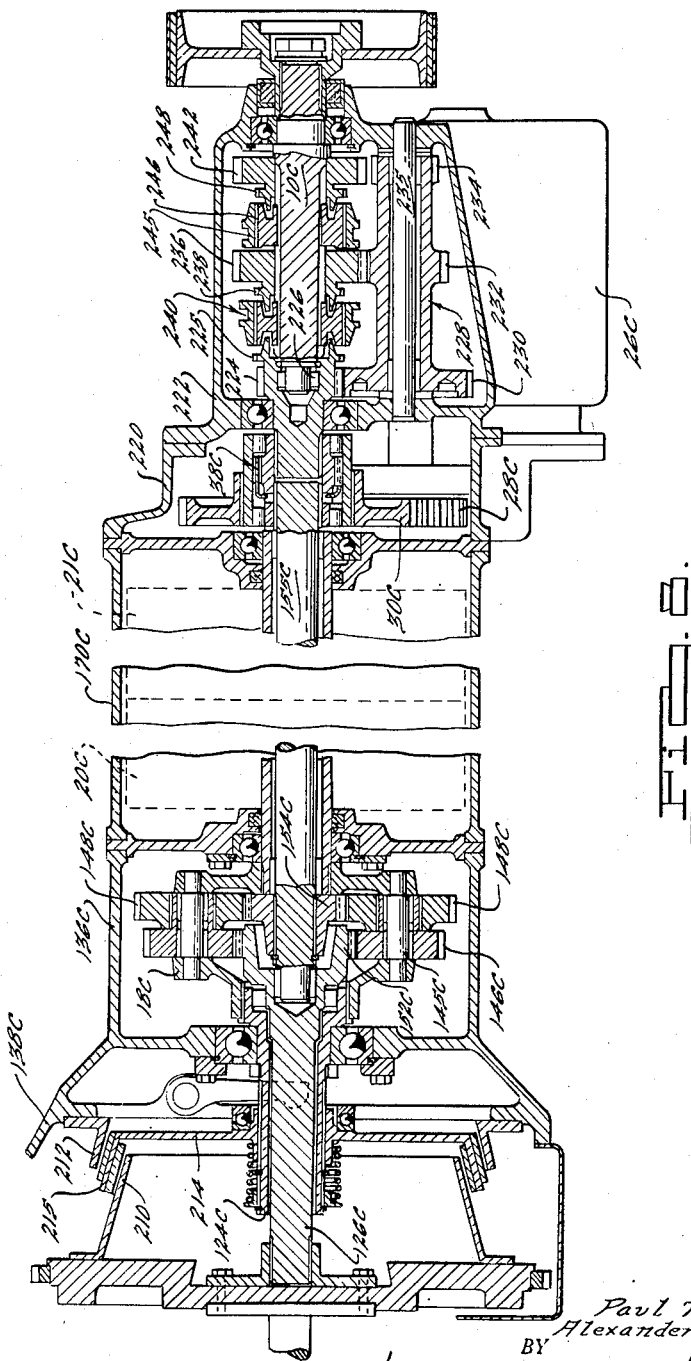

Patented Jan. 19, 1954

2,666,492

UNITED STATES PATENT OFFICE 2,666,492

ELECTROMECHANICAL CHANGE-SPEED TRANSMISSION AND BRAKE CONTROL FOR VEHICLES

Paul T. Nims and Alexander Chadkewicz, Detroit, Mich.; said Chadkewicz now by change of name Alexander Chadwick, assignors to Chrysler Corporation, Highland Park, Mich., a corporation of Delaware Original application January 23, 1948, Serial No. 3,847. Divided and this application August 4, 1950, Serial No. 177,652

16 Claims. (Cl. 180—65)

This invention relates to power transmission systems of the electro-mechanical type. In its broader aspects the invention is concerned with the provision of improved power transmission mechanism of the automatically variable ratio type adapted to be controlled by an electric controlling system of one of the varieties disclosed in copending applications Serial Numbers 681,630 and 167,168, filed July 6, 1946, and June 9, 1950, respectively, and now U. S. Patent Numbers 2,571,284 and Re. 23,314, respectively, in the name of Paul T. Nims, one of the present applicants. The instant application forms a division of Nims et al. application Serial No. 3,847, filed January 23, 1948, and now U. S. Patent No. 2,588,750.

An important object of the invention is to provide novel, compact, rugged, and efficient mechanism for use in a transmission of the indicated character, employing a planetary differential drive for simultaneously imparting torque to an electric drive system and to a mechanical drive component having mechanical connection with the rear wheels or other load, the arrangement being such as to impart to the driven wheels or load a variable ratio drive, the characteristics of which are essentially dependent upon and automatically changed to suit the torque demand upon the engine.

A related object is to provide such a transmission which employs a dual electro-mechanical high-torque drive of variable ratio and incorporates novel direct drive lockup clutch means operable above a predetermined speed, and when the torque demand is not excessive to provide a positive mechanical two-way high speed drive, which may be either direct or overdrive and which eliminates all slip and losses incident to the electrical components during normal high speed operation.

Still another object related to that last noted is to provide such an electro-mechanical transmission having positive two-way mechanical drive for both direct and overdrive speeds.

A further object is to incorporate novel and improved regenerative braking means adapted to provide effective braking action when desired, through the drag of electrical components.

Another object is to provide improved means for changing the transmission driving ratio between direct drive and overdrive and vice versa.

Still another object is to incorporate the essential mechanical components of such a transmission system in a compact, rugged, easily serviced and relatively inexpensive assembly of unitary character, the arrangement of which is such that all important components are readily and independently accessible for servicing adjustment or replacement.

It is a further object of this invention to incorporate an improved freewheeling drive arrangement between the electric motors used during high-torque, low-speed driving and the propeller shaft, the parts being so disposed that the propeller shaft may be driven independently or jointly by either the prime mover of the vehicle alone (conventionally a gasoline engine) or by both the prime mover and the supplemental electric motor means previously referred to.

A further important object of the invention is to incorporate improved transmission means adapted to derive power from a prime mover such as a gasoline engine and to deliver the torque developed by the engine to a propeller shaft or other driven element through the agency of coacting mechanical and electrical driving means of novel character, the mechanical driving means serving both to deliver power directly to the propeller shaft or other driven element, and also to actuate in a novel and highly efficient manner electrical generating means so arranged that the electrical output thereof provides a driving connection of infinitely variable ratio between the engine and propeller shaft or driven element.

Other objects and advantages will become apparent upon consideration of the present disclosure in its entirety.

In the drawings:

Figures 2A and 2B show in central, longitudinal section, the front and rear halves, respectively of an electromechanical transmission incorporating the principles of the present invention, some of the parts being diagrammatically indicated, and the views being designed to be read as if horizontally aligned, with Figure 2A at the left;

Figure 2C is a sectional detail taken substantially on the line 2C—2C of Figure 2B and looking in the direction of the arrows;

Figure 4 is a schematic wiring diagram of the electrical components of the transmission, also showing certain of the mechanical parts;

Figure 5 is a schematic wiring diagram showing a modified control system;

Figure 7 is a schematic wiring diagram of a control system for the transmission of Figure 6;

Figure 8 is a view similar to Figure 6 showing another modified construction;

Figure 1:
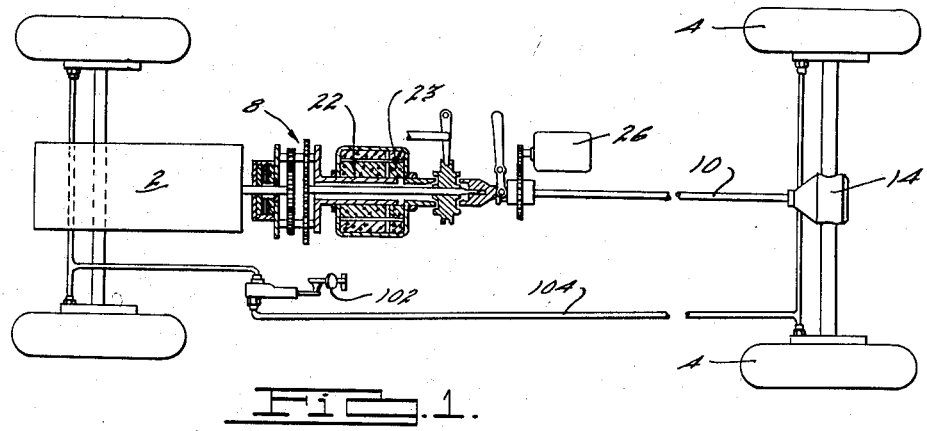
Figure 1 is a diagrammatic plan view of a motorcar propulsion system incorporating the principles of the present invention.
Figure 3:
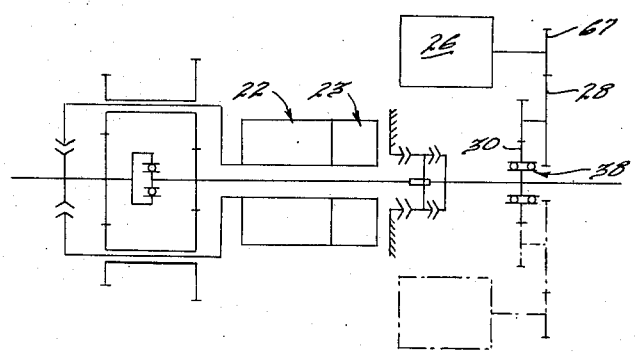
Figure 3 is a schematic diagram of the principal mechanical components of the transmission of Figures 2A and 2B, and also of the transmission of Figure 6.

Referring now to the drawings, and particularly to Figures 1 to 4 inclusive, reference character 2 designates a prime mover, which may be a conventional gasoline engine, shown at the front of a vehicle chassis, which is indicated only diagrammatically by the arrangement of the wheels and running gear, the engine being arranged to drive the rear wheels 4 through the conventionally arranged propeller shaft 10 and differential mechanism 14. It will be recognized that the character and arrangements of the components thus far mentioned may be varied considerably without departing from the present invention, which is concerned with the means for transmitting torque at varying ratios from the engine to the propeller shaft.

The embodiment of Figures 1 to 4 inclusive is adapted for use with an A. C.-D. C. generating and control system similar to one of the types disclosed in the aforementioned Nims application, Serial No. 768,118, now U. S. Patent Number 2,506,809, to which application reference may be had for a detailed discussion of the action of the electrical components. Essentially, the system includes an alternator 22 and exciter 23 driven by the engine 2 through planetary-differential gearing generally designated 8, an electric motor 26 which derives its power from the output of the alternator, and mechanical means for connecting either the engine alone or both the engine and the electric motor 26 to the propeller shaft 10. The electric motor 26 is a series wound D. C. motor which is connected to the propeller shaft by means of gears 28, 30, the former meshing with a pinion 67 fast upon the armature shaft of the motor 26 and the latter carried by the propeller shaft. An overrunning clutch, generally designated 38, is interposed between the gear 30 and the propeller shaft, and means (presently to be described) is provided to lock up the overrunning clutch to effect a positive two-way drive at desired times.

The alternator 22 has two three-phase windings, the output of which is rectified by means of two banks of discontinuous type half-wave rectifier tubes, the tubes of one bank being designated V1, V2, and V3, and the tubes of the other bank V4, V5, and V6. The windings constituting one set of the two separate sets of three-phase alternator windings are designated A, B, and C respectively and the corresponding windings of the other set are designated A', B', C', each winding of one set being 180° out of phase with the corresponding winding of the other set. The outer ends of the Y-connected windings A, B, and C are respectively connected to the anodes of the rectifier tubes V1, V2, V3 respectively, while the outer extremities of the corresponding windings A', B', C' are connected, respectively, to the cathodes of the similar tubes V4, V5, and V6 of the other bank. The common terminals of the two Y windings of the alternator are connected to one pair of contacts, a, of a series-parallel switch generally designated SW1. The cathodes of the left bank of rectifier tubes are connected to another pair, b, of such contacts, and the anodes of the right bank of tubes are connected to a third pair c, of such contacts. Switch SW1 is actuable by means of a solenoid S1 to connect the two three-phase alternator windings either in series or in parallel, the parallel arrangement being employed for starting and the series arrangement after the vehicle comes up to speed. The output of the alternator is controlled by controlling the excitation of its field winding 60 by means of the exciter generally designated 23, and the rectified output of the alternator is fed to the motor 26. Such connection is effected by conductors 62, 64, the former of which is connected to the field coil 65 of the motor through a reversing switch RS which enables reversing the field and so the direction of rotation of the motor. The exciter 23 is provided with two field coils 66, 68, field coil 68 being in series with the motor 26 and so disposed that the voltage therein bucks the voltage developed in the field coil 66, so that as the voltage in field coil 68 rises with the counter E. M. F. developed by the motor 26, the output of the exciter is reduced. The voltage developed in field coil 66 is also adjustably controllable by a series variable resistor 70, while the voltage developed in the bucking coil 68 is similarly adjustably controllable by a shunted variable resistor 72. The motor 26 and solenoid S1 are connected in shunt when the motor is energized, and both are connected in series with the rectifier output and bucking coil 68. When the voltage in solenoid S1 rises to a sufficient value, due to rising counter E. M. F. of the motor 26, it shifts the switch SW1 from the position shown in Figure 4, wherein the two three-phase alternator windings are in parallel for starting, to a series arrangement for higher speed operation. When operating either in series or in parallel, the output of the exciter is regulated by the governing action of the bucking coil. Desired output characteristics are thereby imparted to the alternator in a well known manner, as will be apparent.

The circuit between the exciter 23 and alternator field coil 60 is adapted to be made and broken by the contacts a of a switch SW2 operable by a solenoid S2 connected in series with the vehicle storage battery 75 or other convenient source of power. In series with the battery and solenoid S2 is a manually operable switch SW3 which may comprise the ignition switch for the engine 2, or be ganged with the ignition switch for concurrent opening and closing. Also in series with the solenoid S2 are the contacts a of a throttle-operated switch assembly SW4. The throttle operating means is depicted in the form of a diagrammatically illustrated accelerator pedal 77 which is normally held in the raised or idling position by a spring 78 which also serves to hold the contacts a yieldably closed so that the circuit to solenoid S2 is completed whenever the switch SW3 is closed and the accelerator pedal is released. By virtue of this arrangement when the switch SW3 is closed, in order to start the engine 2, contacts a of SW4 are closed so long as the accelerator pedal is not depressed, and the circuit of field coil 60 is thereby held open at contacts a of SW2 by solenoid S2, and the alternator 22 delivers no output to the motor 26. When the engine 2 is speeded up by depressing the accelerator pedal 77 to open the throttle, the circuit to solenoid S2 is broken at the contacts a of switch SW4, permitting completion of the circuit between the exciter and the alternator field 69 by the resultant closure of contacts a of switch SW2. Current generated by the alternator is then fed to the motor 26 in the manner previously described.

The switch SW2 also operates a second set of contacts b and a third set of contacts c. The contacts b are in a holding circuit for the solenoid S2 while the contacts c are in an operating circuit for a clutch actuating solenoid 80. A double pole single throw governor switch SW5 has one pair of contacts a in series with the contacts b of switch SW2 and a second pair of contacts b in series with the contacts c of switch SW2. A governor mechanism generally designated 82 is provided, drivable by and in proportion to the speed of the propeller shaft 10 and so connected to the switch SW5, as by the linkage 84, as to close the contacts of switch SW5 when the vehicle reaches a predetermined speed, and keep them closed above such speed. It will also be noted that the switch SW4 incorporates a pair of contacts b arranged in series with both pairs of contacts a and b of switch SW5 and connected to the power source 75 through the hand switch SW3 by a conductor 85. Contacts b of SW4 are closed at all times except while the accelerator pedal is depressed to a kickdown position which may be beyond the fully open position of the throttle. By virtue of this arrangement, when the vehicle is accelerated by uninterrupted depression of the accelerator pedal to a speed above the governor-actuated closing speed of the switch SW5, contacts b and c of the switch SW2 remain open so long as the accelerator pedal 77 is depressed. If the throttle is allowed to close momentarily, however, by releasing the accelerator pedal, while the vehicle is traveling above such speed, a circuit is completed from the power source through conductor 85, contacts b of switch SW4, and contacts a and b of switch SW5 to the contacts b and c of switch SW2. Since the momentary release of the accelerator pedal has closed the contacts a of switch SW4 and completed the circuit to solenoid S2, the contacts b and c of switch SW2 have been closed almost instantaneously with the contacts a of switch SW4. Accordingly, the current to the solenoid S2 is maintained (so long as the car speed is above the critical value mentioned and the kickdown contacts b of SW4 are not opened) through the holding circuit comprising conductor 85, contacts b of switch SW4, contacts a of switch SW5, conductor 92 and contacts b of switch SW2. A circuit is also maintained in the same manner to the solenoid 80 by way of the contacts b of switch SW5, conductor 94 and contacts c of switch SW2. The solenoid 80 initiates and maintains engagement of a direct drive clutch presently to be considered in greater detail. The direct drive clutch effects direct mechanical connection between the engine 2 and the propeller shaft 10, so that after such momentary throttle closure and reopening of the throttle sufficiently to keep the vehicle traveling at a speed above the critical governor-actuated closing speed of switch SW5, the vehicle proceeds in direct drive and the electromechanical transmission mechanism is rendered ineffective.

It will be noted that during such direct drive operation, with the accelerator depressed, the contacts a of switch SW2 are held open, disabling the alternator 22 so that the motor 26 is no longer energized and the propeller shaft may overrun the motor 26 at the overrunning clutch 38.

When, with the accelerator still depressed, the vehicle speed falls to such value that the switch SW5 is opened by the governor 82, the solenoid S2 is deenergized and the electrodynamic torque multiplying drive is reinstituted, the holding circuit and the direct drive clutch circuit being simultaneously opened by the switch SW5, while contacts a of switch SW2 again close to cause excitation of the alternator field and again supply power to the electric motor 26.

The system also incorporates dynamic braking means so arranged as to place an electrical load other than that represented by the motor 26 upon the alternator at desired times when the latter is being driven upon coast. The load is variable and comprises two resistors 98, 100 connected in series with one another and shunted across the motor. A switch SW6 is so connected to and operable by the accelerator pedal 77 that its contacts a, in series with resistors 98, 100, are closed, to complete the circuit through the dynamic braking load resistors 98, 100 only when the accelerator pedal is completely released. Another set of contacts b, of SW6 are in series with motor 26 and are opened in response to complete release of the accelerator pedal, and a third set of contacts c are connected in a shunt circuit across contacts a of SW2 and are arranged to be closed to render the alternator operative, when the accelerator pedal is fully released. A resistor 99 may also be incorporated in series with contacts c of SW6, to reduce the output of the alternator under these conditions. The dynamic braking load is further increased by shorting out one of the resistors, as 98, by means of a short-circuiting switch SW7, which is actuated to closed position when the brake pedal as 102 of the vehicle is depressed. If a hydraulic braking system is employed, as is now customary, one of the hydraulic fluid lines as 104 (the pressure within which is increased when the brakes are applied) may be connected to a bellows structure as 105 arranged to actuate the switch SW7 to closed position whenever the brakes are applied.

Important structural features of a preferred embodiment of the invention are shown in Figures 2A, 2B, 2C, and 3. The engine shaft 110 drives, through the flywheel flange assembly 112 and its hub 114, a cylindrical clutch housing sleeve portion 115 forming part of a coil spring clutch assembly. The sleeve section 115 constitutes the forward half of the outer casing for the helical power transmitting spring 116, while a mating coaxial sleeve section 118 houses the rear half of the spring. The rear spring sleeve section 118 is bolted to a flange 120 formed integrally with an inner sleeve 122 which projects forwardly through the interior of the spring 116 a distance such that its end is aligned with the forward end of the outer rear sleeve section 118. Sleeve 122 is keyed to a hub portion 124 journalled, as on the smooth bearing 125, upon the transmission input shaft 126, which is also keyed to hub 114. A forward inner sleeve portion 128 which is fitted into the forward outer sleeve portion 115 lies within the forward half of the driving spring 116 and is keyed to the shaft 126 so that the parts 114, 115, and 128 turn as a unit with the shaft 126. Inner sleeve portions 122, 128 are of the same diameter and end-abutting so as to form a continuous internal cylindrical support for the spring, while the inner surfaces of the outer sleeves 115, 118 similarly form a smooth and essentially continuous cylinder. At its rear extremity the driving spring 116 is positively secured to the sleeve assembly 118, 122 to turn therewith at all times. The spring is of such radial thickness and of such stiffness that it does not when relaxed grip any of the sleeve surfaces, and the spring may turn freely between sleeves 115, 123, permitting independent rotation of the engine shaft 110 and the planet carrier 18 with respect to one another in either direction. If the forward, free end of the spring is frictionally restrained, however, while it is being rotatively driven from the rear, or if frictional drag means is rotatively driven while engaging the forward end of the spring, the spring is resultantly expanded or contracted in accordance with the relative direction of rotation, to cause the spring to grip either the inner or the outer sleeve surfaces and transmit a drive from one to the other. The restraining of the forward end of the spring may be effected through the agency of a plurality of longitudinally slidable fingers 130 movable to project more or less through a forward wall 115′ formed integrally with sleeve 115, so that the rear ends of such fingers may engage the ring 117, keyed to the front end of the spring. The fingers are actuated by a longitudinally slidable ring 132 mounted on the reduced forward hub portion 115² of the sleeve 115, the ring being actuatable by a shifter yoke (unshown) movable by the solenoid 80.

The rear extremity of the driving hub portion 124 for a planetary system about to be described is enlarged and provided with external splines as indicated at 134 to provide a driving connection with the carrier 18 of the planetary gear system housed within a compartment 136 formed integrally with the casing 138 which also houses the "L. G. S." clutch means, but separated therefrom by a bulkhead 140 which also supports an anti-friction bearing assembly 142 serving as journalling means for the hub 124. The rear extremity of the hub assembly 124, 134 is fitted into the conformably internally splined hub portion 135 of the planet carrier 18. The carrier supports a plurality of longitudinally extending planetary pinion shafts 145 upon each of which is a pair of planet pinions as 146, 148, the two pinions of each pair being interkeyed or otherwise secured together to turn as a unit. Bearing means 150 is interposed between each such pair of pinions and its shaft 145. In each instance the forward pinion 146 is smaller than the rear pinion 148. The smaller forward pinions 146 mesh with a sun gear or side gear 152, which is hollow and which is rigidly carried by the rear extremity of the engine-driven shaft 126 so as to form a driving portion for the planetary system. The planet pinions 148 mesh with a sun gear or side gear 154, which forms one output portion for the planetary system and is keyed to or otherwise made fast upon the main transmission shaft 155, the forward end of which is piloted in the hub of the front sun gear 152, as by the bearing means 156. A forwardly projecting extension 158 of the hub of the rear sun gear 154 forms the inner cam element of a roller-type overrunning clutch which is housed within the hollow interior of the forward sun gear 152, while the inner surface of sun gear 152 is contoured to form the other wedging element of such overrunning clutch, the rollers 160 being interposed in the usual manner and positioned by a cage 162. The overrunning clutch just described is so arranged that the forward sun gear 152 is permitted to turn forwardly faster than the rear sun gear 154, but such sun gears are locked together by wedging of the rollers 160 when the rear sun gear tends to rotate forwardly faster than the front sun gear.

At its rear extremity the planet carrier 18 is keyed to a tubular shaft 165 concentric with the shaft 155 and carrying fast thereupon the rotors 20, 21 of the alternator and exciter respectively. The hollow shaft 165 provides one output portion for the planetary system and is journalled upon the shaft 155 by the bearing means 166, 168 located near the ends of the hollow shaft. The alternator and exciter, and the shaft portions 155, 165 extending therethrough, are housed in a casing portion 170 secured to and extending rearwardly from the casing portion 136. Shaft 165 is journalled in anti-friction bearings 172, 174 supported by the forward and rear bulkheads 175, 176 respectively which define the end closures for the casing section 170. The shaft 155 projects through and from the rear bulkhead 176 and carries slidably splined thereupon a dog-toothed clutch element 178 provided with an external groove 180 so arranged that the clutch member may be conveniently operated by conventional shifter fork means or the equivalent (not shown). A lever for moving the fork and clutch member is diagrammatically indicated at 179. Clutch element 178 is movable forwardly to engage its forward toothed portion 182 with a cooperatively toothed fixed clutch portion 184 rigidly attached to the bulkhead 176 as by studs 185.

When the clutch element 178 is moved to the rear extremity of its sliding movement, its toothed portion 182 engages a conformably toothed portion 188 carried by the forward extremity of the tail shaft 19, which is also socketed as indicated at 190 to provide a pilot bearing for the rear extremity of the shaft 155. When the clutch element 178 is in the neutral position in which it is shown in Figure 2B, no mechanical drive can be transmitted to the tail shaft and transmission shaft 155 may spin freely. Clutch element 178 is housed in a casing extension portion 194 secured to and extending rearwardly from casing section 170 and the bulkhead 176. Casing section 194 is divided intermediate its length by a transverse partition 195 which supports an anti-friction bearing 196 journalling the forward extremity of the shaft 10 and defining a forward compartment containing the clutch element 178 and associated elements, and a rear compartment containing the electric motor driving gear 30 and the overrunning clutch generally designated 38.

Gear 30 is fast upon a sleeve 32 journalled on the propeller shaft, as upon roller bearings 34, 35, the sleeve being substantially larger than the shaft so as to be spaced outwardly from the shaft by such bearings, to accommodate within the sleeve and between such bearings the overrunning clutch components, consisting of an inner sleeve or cam assembly 36 keyed to the propeller shaft, rollers 40 interposed between the sleeves in the conventional manner and adapted to permit the electric motor to drive the propeller shaft forwardly while allowing the propeller shaft to overrun the electric motor, and means for locking the rollers to provide a two-way or reversible drive between the electric motor and the propeller shaft, such lockup means for the overrunning clutch including means for sliding the rollers 40 longitudinally from their normal overrunning position in which they are shown in Figure 2B to a lockup position in which they serve as positive keys for driving the propeller shaft sleeve 36 in either direction. When so moved to the left, the rollers fit between relatively short projecting teeth 42 carried by sleeve 36 and defined and connected by relatively gradual and shallow concave portions of substantially cylindrical cross section which slope upwardly uniformly in both directions from their deepest mid portions, such concave portions being designated 44 and being of such character that the rollers tend to roll up the same towards the peaks of the teeth 42 to provide a wedging drive in either direction. Longitudinal sliding movement of the rollers is induced by sliding their confining cage 45 through the agency of a slotted collar 46 slidably fitted upon the sleeve 32 and having a pin as 48 projecting radially inwardly from the collar through a longitudinal slot 50 in the sleeve 32 and into the cage 45. A shifting yoke (unshown) or other conventional or suitable means may be used for moving the collar and cage to shift the rollers in the manner described.

The actuating yoke for the lockup sleeve 46 of the overrunning clutch 38 is operable through the agency of a lever 48, and the levers 49, 179 are provided with common actuating means including a link 51 which may be actuatable by means of a suitably positioned hand lever as 53 mounted, for example, on the steering column 57 of the vehicle. The link 51 has a slotted portion 59 providing lost-motion connection with the lever 49 so that the rollers 40 of clutch 38 are moved forwardly to the lockup position simultaneously with movement of clutch member 178 to the forward position in which it locks up the shaft 155, while the overrunning clutch rollers are moved to their rearward, operative position when clutch member 178 is in either the neutral position or the rearward, direct drive position.

The rear compartment of casing section 194 also communicates interiorly with the space within the rear end cover 198 of the motor 26, within which cover the driving pinion 67 of the electric motor is housed and by virtue of which intercommunication said pinion may mesh with the gear 28. As previously indicated, the overrunning clutch 38 is so constructed that by shifting the collar 46 it may provide either a one-way forward-operating driving connection between the electric motor and the tail shaft or a positive two-way drive.

In considering the operation of this embodiment of the invention it will be noted that the high torque drive employed for starting and accelerating the vehicle at lower speeds is instituted with the toothed clutch element 178 in its rearward position in which it provides positive driving connection between the shaft 155 and the tail shaft 10, and the increase of driving speed ratio of the transmission up to and including direct drive occurs without disturbing the position of this clutch member, which need only be moved to establish neutral or reverse. Thus the hand lever 53 need have only three positions, viz: forward, neutral and reverse. Upon starting, the coil clutch spring 116 is released so that the cage 18 is free to turn faster than the driving shaft. The engine turns the sun gear 152 at engine speed and since the inertia of the vehicle opposes rotation of the sun gear 154, and so opposes independent rotation of planet pinions 148 about their own axes, the sun gear 152 turns the pinion assemblies 146, 148 bodily forwardly, causing the gear 148 to roll forwardly upon the sun gear 154 at an increased speed due to the relative sizes of the gears. The planet pinion shafts and the cage 18 are accordingly turned forwardly at a speed in excess of that of the driving shaft 126 and such rotation of the cage turns the rotors 20, 21 of the alternator and exciter respectively. With the contacts $a$ of switch SW2 closed for acceleration in electric drive in the manner previously described the power required to drive the alternator imposes a drag upon the cage 18, and the reactive force of this drag tends to turn the sun gear 154 and connected shaft 155 and tail shaft 10 forwardly, due to the fact that the arresting or partial arresting of rotation of the cage 18 allows the planet pinions 148, 148 to turn backwardly about their own axes in response to forward rotation of the front sun gear 152, and the rearward rotation of planet pinions 148 transmits a forward rotation to gear 154. As the speed of the alternator increases and its output, fed to the motor 26, causes the latter to accelerate the vehicle, acting through the gears 28, 30 in the manner previously described, torque is also directly applied to the tail shaft through the reactive action of the planetary gearing, in the manner previously described. It will also be noted, however, that the alternator may turn faster than the driving shaft, and that when the drag of the alternator is sufficiently high, the reactive torque may transmit a drive to the tail shaft which brings the tail shaft up to the speed of the driving shaft or might even tend to cause it to rotate faster than the driving shaft. Due to the presence of the overrunning clutch 169, however, the tail shaft cannot turn faster than the driving shaft, and it will also be appreciated that with the clutch 178 in its normal forward drive position in engagement with clutch portion 188, the tail shaft tends to turn the engine through the overrunning clutch 169 to provide engine braking whenever the rear wheels tend to turn faster than they would be driven by the engine. This arrangement also insures synchronization of the driving and driven parts of the coil spring clutch at the time it engages to establish the direct drive, since such engagement is effected in response to momentary closure of the throttle when the vehicle is traveling above a predetermined speed, as previously described. Upon release of the accelerator pedal under normal conditions, the rear wheels will tend to drive the engine, and the driving and driven parts will be synchronized at the overrunning clutch 169, as previously noted. There will thus be no tendency to overheat the parts of the L. G. S. clutch due to drag. Since the sun gears 152, 154 will then be turning at the same speed, the cage 18 will be locked thereto and will also be turning at the same speed as the tail shaft, and will thereby also turn the engine-connected shaft 126 at the same speed. When the accelerator pedal is again depressed, tending to speed up the engine and to drive the parts forwardly in the opposite direction, which would tend to release the overrunning clutch 169, the coil spring 116 is engaged by the action of the solenoid 80 concurrently with the closing of contacts $a$ of accelerator pedal operated switch SW4 in the manner previously described. It is also to be observed that the solenoid 80 remains energized during direct drive operation, so that there is a constant tendency to re-energize the spring 116 and cause the same to bind again immediately, if it should be released while the vehicle is operating in direct drive.

As the vehicle slows down to such speed that a downshift to electro-mechanical drive is called for, the switch SW5 opens, de-energizing the direct drive clutch solenoid 80. The characteristics of this clutch are such that when the fingers 130 are withdrawn so that they no longer exert their restraining effect upon the end of the spring 116, the spring releases itself even though it is transmitting full torque. Spring clutches of this type and having this characteristic are commercially available and are well known in the art. This re-establishes the planetary gear differential drive of the generating means and tail shaft required for the higher torque drive.

Dynamic braking is introduced whenever the accelerator is released with the car moving forwardly and the hand lever 53 in the forward drive or "F" position. When the vehicle is moving forwardly at a speed below that at which SW5 is closed by the governor 82, release of the accelerator pedal 77 results in closing of contacts $a$ of SW4 and resultant opening of contacts $a$ of SW2. At the same time contacts $c$ of SW6 are closed, thereby placing the resistor 99 across the contacts $a$ of SW2 to excite the alternator field at reduced potential and provide for a reduced alternator output. Contacts $a$ of SW6 are closed at the same time to put the dynamic braking resistors 98, 100 across the rectified output of the alternator and thereby provide a load. The clutch 178 is at this time providing a direct drive between the tail shaft 10 and the inner cam element 158 of the overrunning clutch assembly located in the forward planetary train, as well as between the tail shaft and rear sun gear 154. Overrunning clutch rollers 160 thereupon lock and the tail shaft accordingly drives the engine and both sun gears 154, 152 forwardly. This will be seen to lock up the double planetary gear train and thereby drive the cage and its connected alternator and exciter rotors 20, 21 forwardly at one-to-one ratio. Since the alternator is loaded by the braking resistors 98, 100, as previously noted, both regenerative braking and engine braking are provided.

When the accelerator is similarly released with the vehicle traveling at a higher speed and the governor switch SW5 closed so that the direct drive spring clutch 116, etc., is engaged, the braking action is the same except that the planetary system is also locked up by reason of the engagement of the spring clutch.

For reverse operation, hand lever 53 is moved to shift the clutch element 178 forwardly to lock the shaft 155 stationary by engagement of clutch element 178 with clutch teeth 184, and roller clutch 39 is simultaneously locked up in the manner previously described. The rear sun gear 154 is thereby locked, and the planet pinions 148 roll thereupon as the cage is driven by the engine. The alternator is thus operative, and when the reversing switch RS is thrown to the reverse position, motor 26 is driven rearwardly to turn the tail shaft in a reverse direction and back the vehicle.

In event it is not desired to provide any braking effect in response to release of the accelerator pedal, the control arrangement may be modified in accordance with the showing of Figure 5, which illustrates a circuit providing for no braking in response to release of the accelerator pedal, the switch SW8 being provided to replace both of the switches SW6 and SW7 of the previously-described embodiment. Switch SW8 is operable in response to depression of the brake pedal, as by means of the bellows-diaphragm 105A. Other parts of this embodiment depicted in Figure 5 and corresponding to those of the embodiment above described, are designated by like reference characters with the parts distinguished by the addition of the letter "A" to each. Upon actuation of the brakes, the contacts $a$ of switch SW8, which contacts are in series with the dynamic braking load resistor 98A, are closed, and the contacts $b$ in series with the motor 26A are open, while the contacts $c$ of switch SW8 are simultaneously closed to place the resistance 99A across the contacts $a$ of switch SW2A. It will be appreciated that with this arrangement the action of the accelerator pedal is more analogous to the arrangement usually employed in present day motorcars, while when the brake pedal 102 is actuated, its effect upon the conventional hydraulic brakes is supplemented by the drag imposed by the alternator. The power required to drive the alternator, and its braking effect, may of course be determined by selection of the values of the resistors 98A, 99A. With this modified embodiment there is no tendency of the car to "creep" when standing with the lever 53 in the F position and the engine idling since the generator creates no substantial drag at such time, whereas in the first embodiment a certain amount of "creep effect" results from the reaction torque transmitted to the tail shaft under such conditions since the drag of the generator is increased due to the connection of the braking resistors 98, 100 across it, and the resultant holding effect upon the planet carrier results in transmitting of a certain amount of torque from sun gear 154 to the rear wheels. This may or may not be sufficient to cause the car to move or "creep," depending upon various factors including the engine idle setting, but if present to an objectionable degree under some conditions of operation of the first embodiment, may readily be controlled by means of the brake pedal, as is common practice in the operation of presently used transmissions employing hydraulic torque transmitting elements, or may be eliminated entirely as for example by employing the control system of the second embodiment of Figure 5. The other portions of this embodiment, which function similarly to the corresponding parts of the embodiment first described, will require no detailed redescription.

Figure 6:
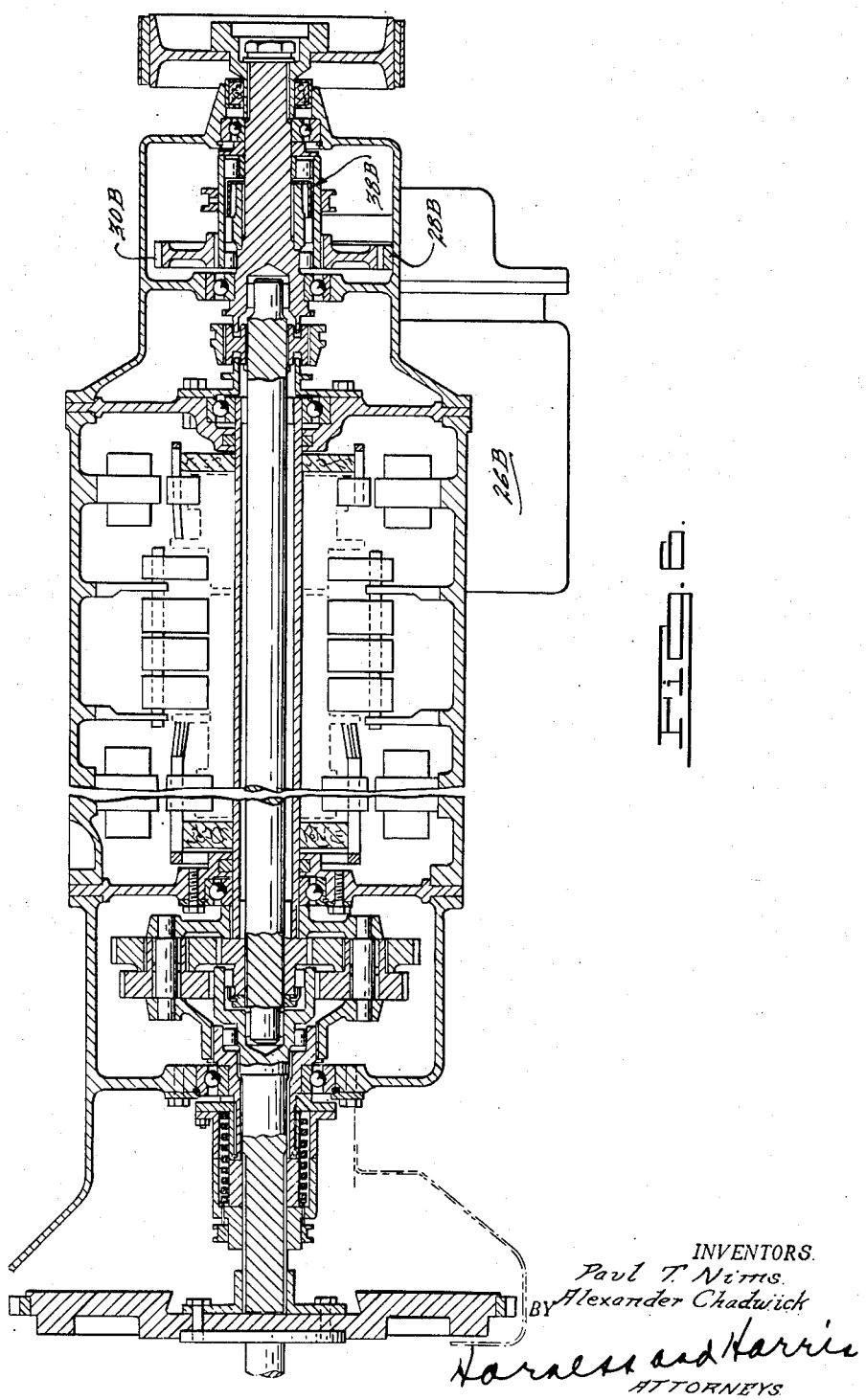
Figure 6 is a view similar to the composite showing of Figures 2A and 2B but on a smaller scale, showing a somewhat modified construction suitable for full D. C. operation.

In Figures 6 and 7, we have shown another somewhat modified arrangement wherein a D. C. generator is substituted for the A. C. alternator and the rectifying means employed in the first two embodiments. The D. C. generator is generally designated 22B. Other parts of this embodiment corresponding to those already described are designated by similar reference characters distinguished by the addition of the letter "B" to each.

In this embodiment of the invention, two series wound electric motors 26B, 26B' are employed, both of which are connected as by idler gears 28B to the same driven gear 30B mounted on the tail shaft 10B and connected thereto through an interposed overrunning clutch 38B in a manner analogous to the arrangement of the corresponding parts of the embodiment of Figures 1-4.

The electrical control system is arranged in such manner that the motors may be placed in series for starting, to reduce the starting current, and then thrown to a parallel arrangement for running, the series-shunt switch being designated SW1B and operable similarly to the switch SW1 of the embodiment first described, through the agency of a solenoid S1B, although it acts upon the motors rather than the generator windings and is adapted to be thrown from series to parallel when the voltage reaches a predetermined value, rather than from parallel to series. The output of the D. C. generator 22B is fed to the motors 26B, 26B', through the series-shunt switch contacts and through reversing switch means consisting of two ganged and simultaneously operable reversing switches RSB and RSB', in a manner which will be seen to be analogous to the arrangement of the parts of the first described embodiment, although of course the rectifying means is eliminated. The exciter bucking field coil 68B is similarly connected in series with the D. C. generator output to regulate the same through its action upon the output of the exciter, generally designated 23B.

It is believed that the operation of the above noted and other parts of the embodiment of Figs. 6 and 7 will be apparent, in view of their essential similarity to those of the first described embodiment. It will be noted in connection with the use of the two D. C. driving motors 26B, 26B' employed in the high torque electro-mechanical drive, that only a single overrunning clutch 38B is required to free the electric motors and permit the propeller shaft to overrun them during higher speed operation.

Figure 9:
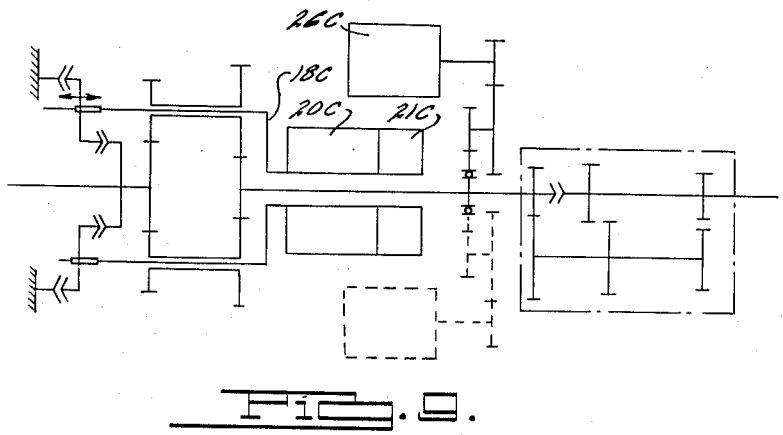
Figure 9 is a schematic diagram of the principal mechanical components of the embodiment of Figure 8.
Figure 10:
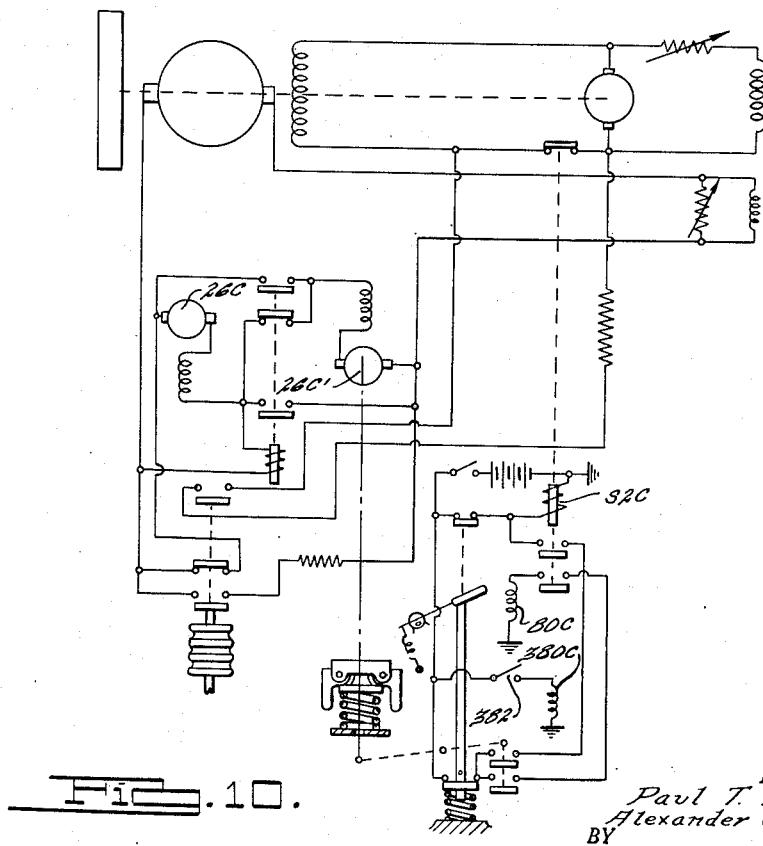
Figure 10 is a schematic wiring diagram of the control system for the transmission of Figure 9.

The further modified construction shown in Figures 8, 9, and 10 is also depicted as designed for full D. C. operation, that is, for the use of a D. C. generator and a pair of D. C. motors to provide the electric drive, although it will be readily apparent that the principles of this embodiment are also equally suitable for use with an A. C.-D. C. circuit such as that shown in Figures 4 and 5. With the arrangement shown in Figure 8, a mechanical reverse is provided, so that no reversing switches need be provided for the electric motors 26C, 26C'. The control circuit, shown in Figure 10, is thus essentially the same as that of Figure 7 but without electrical reversing means for the motors 26C, 26C'. In Figure 7, moreover, the dynamic braking system corresponds to that of Figure 4 in that a certain amount of dynamic braking is introduced in response to release of the accelerator pedal, while in the case of the embodiment of Figures 8, 9, and 10 dynamic braking is only introduced in response to actuation of the brake pedal, as in the embodiment of Figure 5. Other elements of the embodiment of Figures 8, 9, and 10 corresponding to those previously described are also designated by corresponding reference characters distinguished by the addition of the letter "C" to each.

The components of the planetary gearing are essentially similar and are housed in an equivalent housing section 136C. The generator 26C and exciter 21C, housed in the casing section 170C may also correspond to those of the last described embodiment. It will be noted, however, that in lieu of the L. G. S. spring-type direct drive clutch, a three position cone clutch assembly is employed having a pair of spacedly mounted cone clutch elements 210, 212, the former secured to the flywheel 111 and the latter rigidly carried by the clutch housing portion 136C. A longitudinally slidable clutch element 214 is splined to the planetary carrier driving hub 124C within the clutch housing portion 136C and is movable to engage its conical, faced peripheral portion 215 with either the cone 210 or the cone 212, so that the cage 18C may either be driven by the engine or held stationary, at the will of the operator or as determined by the control mechanism. Alternatively when the slidable clutch element 214 is in the intermediate position in which it engages neither of the faces 210, 212, the cage is free to rotate and no drive can be transmitted through the gearing except that due to the reaction effect of the generator drag upon the cage 18C. Thus during high torque electromechanical drive, element 214 is free of both of the surfaces 210, 212, and the cage 18C tends to spin as gear 148C rolls upon the driven pinion 154C. The current developed by the generating system then powers the electric motors, which transmit torque to the tail shaft by means analogous to that used in the previously disclosed embodiments, while torque is also similarly transmitted to the tail shaft through the gear 154C and shaft 155C as a result of the reaction resulting from generator drag.

When direct drive is called for, clutch element 214 is moved forwardly to engage its face 215 with the clutch element 210 carried by the flywheel 111, thereby locking the cage 18C to the engine shaft. Since sun gear 152C is also driven at engine speed through the shaft 120C, the planetary gearing is locked up, and a direct drive is transmitted to the shaft 155C.

When the clutch element 214 is moved to the rear, it is held stationary by engagement of its portion 215 with the stationary cone element 212, thereby holding the cage 18C against rotation, while the sun gear 152C is rotated by the engine shaft. The gears 146C, 148C then serve as elements in a speed multiplying gear train. Since the driving gear 152C is larger than the driven gear 146C, and gear 148C, which turns with gear 146C about shaft 145C, is larger than the driven gear 154C, the shaft 155C is turned at a speed higher than that of the engine, and an overdrive effect is achieved.

The electric motors in this embodiment drive the shaft 155C, through the agency of gearing 28C, 30C and an overrunning clutch 38C, these parts corresponding generally to those of the last described embodiment. The gearing and overrunning clutch elements just referred to are housed in a special casing section 220 secured to the rear of the casing section 170 and the shaft 155C extends through and from the rear casing portion 220 and into a mechanical transmission casing 222 secured to casing section 220 and forming the rearmost component of the multiple casing assembly. Within casing portion 222 are gear-type transmission components for providing two forward and one reverse speeds, adapted to be selected by the driver. The rear extremity of the shaft 155C carries a driving gear 224 and is also formed with clutch teeth 225. The rear end of the shaft 155C is also axially bored to support, as by the pilot bearing means 226, the forward extremity of the tail shaft 10C. Gear 224 drives the countershaft cluster 228 through countershaft driving gear 230 meshing with the gear 224, and the cluster 228 also includes a reduced speed forward drive countershaft gear 232 and a reverse drive countershaft gear 234, these gears being formed as an integral cluster as shown, and journaled upon a fixed shaft 235, although the details of such gear arrangement and mounting are of course subject to variation. Reduced speed forward drive countershaft gear 232 meshes with a gear 236 loose upon the tail shaft 10C and having clutch teeth 238 similar but opposed to the clutch teeth 225 and spaced therefrom. The conventional clutching element 240 is interposed between the clutching portions 225, 238 and slidably splined to the tail shaft 10C so that such shaft may be selectively coupled to the gear 236 for reduced speed higher torque drive, or directly to the shaft 155C.

Countershaft reverse gear 234 meshes with a reverse idler (not shown) which in turn meshes with the main shaft reverse gear 242 in the usual manner, and shifting means (not shown) also is provided for moving the clutch element 245 carried by the output shaft 10C between the gears 236, 242 to engage the clutch teeth 246 thereof with corresponding clutch teeth 248 carried by the adjoining face of the gear 242, such shifting means being so interrelated with the shifting means (not shown) for the clutch element 240 that clutch 245 can only be engaged when the clutch element 240 is in the neutral position. It will be seen that with the clutch element 245 engaged with the gear 242 a reverse gear drive is provided.

Although the shifting of cone clutch member 214 between neutral and direct drive positions is indicated as controlled by solenoid 86C engageable and disengageable under the influence of switch actuating solenoid 82C, in a manner analogous to the control of the spring-type clutches of the previous embodiments, the shifting of the cone clutch member between neutral and overdrive positions is performed under manual control as by means of solenoid 380C controllable by hand switch 382.

Variations within the spirit and scope of the invention described are equally comprehended by the foregoing description.

What is claimed is:

1. In an electrical driving system for a motor vehicle or the like of the type incorporating a prime mover, a propeller shaft, electrical generator means having an exciter field excited at predetermined potentials for producing proportionate desired generator outputs, means forming a variable ratio drive between the prime mover and the propeller shaft and comprising a reaction type transmission connecting the electrical generator means through a reaction member to each of the prime mover and to the propeller shaft, the system also including electric motor means adapted to be connected to the output of said generating means and to deliver torque to the propeller shaft, dynamic braking means including load-forming resistance, and electrical switching elements at least one of which is pedal-controlled for disconnecting said electric motor means from the output of the generating means and for connecting said load to said output of the generating means so as dynamically to brake said propeller shaft, and a simultaneously pedal-operated circuit comprising a resistance load included in the exciter field of the generator means to excite the latter at a reduced potential and provide for a reduced generator output.

2. In an electrical driving system for a motor vehicle construction or the like of the type incorporating a prime mover, a propeller shaft, electrical generating means, and means forming a variable ratio drive between the prime mover and the propeller shaft and comprising a transmission connecting the electrical generating means to each of the prime mover and the propeller shaft, the system also including electric motor means adapted to be connected to the output of said generating means and to deliver torque to the propeller shaft, dynamic braking means including an electrical load and electrical switching elements, at least one of which is pedal-controlled for disconnecting said electric motor means from the output of the generating means and for connecting said load to said output of the generating means so as dynamically to brake said propeller shaft, said vehicle construction incorporating friction brakes and an actuated pedal for the brakes, means including an operating member for at least one of said switching elements connected to the pedal and operable to connect said electrical load for dynamic braking concurrently with energization of the friction brakes.

3. In an electrical driving system for a motor vehicle or the like of the type incorporating a prime mover, a propeller shaft, electrical generator means, and means forming a variable ratio drive between the prime mover and the propeller shaft, and comprising a reaction-type transmission connecting the electrical generator means through a reaction member to each of the prime mover and the propeller shaft, the system also including electric motor means adapted to be connected to the output of said generator means and to deliver torque to the propeller shaft, dynamic braking means including a load-forming resistance and electrical switching elements, at least one of which is pedal-controlled for disconnecting said electric motor means from the output of the generator means and for connecting said resistance load to said output of the generator means so as dynamically to brake said propeller shaft, said prime mover comprising an internal combustion engine having a throttle control, a switch-actuating member operatively connected to said throttle control and to said switching elements to actuate the latter to connect said resistance load in response to operation of the throttle control.

4. In an electrical driving system for a motor vehicle or the like of the type incorporating a prime mover, a propeller shaft, electrical generating means, means forming a variable ratio drive between the prime mover and the propeller shaft and comprising a transmission connecting the electrical generating means to each of the prime mover and the propeller shaft, the system also including electric motor means adapted to be connected to the output of said generating means and to deliver torque to the propeller shaft, dynamic braking means including an electrical load and electrical switching elements for disconnecting said electric motor means from the output of the generating means and for connecting said load to said output of the generating means so as dynamically to brake said propeller shaft, said prime mover comprising an internal combustion engine having a throttle control and said load comprises a plurality of load members connected to different ones of said switching elements, a switch-actuating member operatively connected to said throttle control and to at least one of said switching elements to actuate the latter in response to operation of the throttle control, said vehicle construction incorporating friction brakes and an actuating pedal for the brakes, and means including an operating member for another of said switching elements connected to the pedal and operable to connect said electrical load for dynamic braking concurrently with energization of the friction brakes.

5. In an electrical driving system for an engine and electric motor driven vehicle or the like incorporating electrical generating means, wheels, electric motor means adapted to be connected to the output of said generating means and to deliver torque to at least one of the wheels, and engine throttle and vehicle brake controls having pedals providing for operator control over acceleration and deceleration of the wheels, mechanical gear-type transmission means including a dual planetary system incorporating two adjacent planetary gearsets, each gearset having planet gears, a carrier carrying the planet gears of both gearsets, and coaxial gears which mesh with the planet gears of the respective gearsets and about which the planet gears rotate, said dual system having two driving portions and having two output portions for the respective generating means and said one wheel, one of said driving portions and one of said output portions being connected to said carrier, the other driving portion being connected to one of said coaxial gears and the other output portion being connected to the other coaxial gear, dynamic braking means including an electrical load, and electrical switching elements operatively connected to at least one of said pedals for causing dynamic braking to be applied concurrently with predetermined control movement of the latter, different ones of said switching elements being effective for disconnecting said electric motor means from the output of the generating means and for connecting said load to said output of the generating means.

6. In an electrical driving system for an engine and electric motor driven vehicle or the like incorporating electrical generating means, wheels, electric motor means adapted to be connected to the output of the generating means and to deliver torque to at least one of the wheels, and engine throttle and vehicle brake controls having pedals providing for operator control over acceleration and deceleration of the wheels, mechanical gear-type transmission means including a dual planetary system incorporating two adjacent planetary gearsets, each gearset having planet means, a carrier carrying the planet means of both gearsets, coaxial gears which mesh with the planet means of the respective gearsets and about which the planet means rotate, said dual system having two driving portions and having two output portions for the respective generating means and said one wheel, one of said driving portions and one of said output portions being connected to said carrier, the other driving portion being connected to one of said coaxial gears and the other output portion being connected to the other coaxial gear, and an overrunning clutch effective in the transmission to provide a one-way driving connection between said coaxial gears, dynamic braking means including an electrical load, and electrical switching elements operatively connected to at least one of said pedals for causing dynamic braking to be applied concurrently with predetermined control movement of the latter, different ones of said switching elements being effective for disconnecting said electric motor means from the output of the generating means and for connecting said load to said output of the generating means.

7. In an electrical driving system for an engine and electric motor driven vehicle or the like incorporating electrical generating means, wheels, electric motor means adapted to be connected to the output of the generating means and to deliver torque to at least one of the wheels, and engine throttle and vehicle brake controls having pedals providing for operator control over acceleration and deceleration of the wheels, mechanical gear-type transmission means including a dual planetary system incorporating two adjacent planetary gearsets, each gearset having planet gears, a carrier carrying the planet gears of both gearsets, and coaxial gears which mesh with the planet gears of the respective gearsets and about which the planet gears rotate, said dual system having two driving portions and having two output portions for the respective generating means and said one wheel, one of said driving portions and one of said output portions being connected to said carrier, the other driving portion being connected to one of said coaxial gears and the other output portions being connected to the other coaxial gear, dynamic braking means including a plurality of electrical load members, and electrical switching elements operatively connected to at least one of said pedals for causing dynamic braking to be applied concurrently with predetermined control movement of the latter, different ones of said switching elements being connected respectively to said generating means and to at least one of the said members of said plurality of members and to said generating means and to the said electric motor means for disconnecting said electric motor means from the output of the generating means and for connecting said load to said ouput of the generating means.

8. An operator-operated transmission drive system for wheeled traction vehicles and the like comprising a wheel-connected shaft for transmitting traction drive torque to the wheels and also being drivable by the wheels under coast conditions wherein the traction wheels provide the torque, electrical generating means, electric motor means adapted to be connected to the output of the generating means and to deliver torque to the propeller shaft, and an infinitely variable ratio gear-type transmission means incorporating dual planetary members forming two adjacent planetary gearsets, each gearset having planets, a carrier carrying the planets of both gearsets, and coaxial gears which mesh with the planets and about which the planets rotate, said transmission means having two driving portions and having two driven portions providing the respective outputs for the wheel-connected shaft and electrical generating means, one of said driving portions and one of said driven portions being connected to said carrier, the other driving portion being connected to one of the coaxial gears, and the other driven portion being connected to the other coaxial gear, said transmission means further having clutch means between at least two said members thereof automatically engageable to establish a one-way 1:1 driving connection through the said two gearsets and thus synchronize the rotation of the members thereof at all speeds under coast conditions that the wheel-connected shaft tends to overrun with respect to one or more of the members of the two gearsets, and clutch means between at least two said members of the gearsets operable to establish a two-way 1:1 drive connection through the gearsets, said last-named clutch means having means for operating the same comprising speed-sensitive control means under control of the operator for effecting the aforesaid two-way drive subsequent to the establishment of the one-way 1:1 driving connection and above a predetermined speed.

9. A transmission drive system for wheeled traction vehicles and the like comprising a wheel-connected shaft for transmitting traction drive torque to the wheels and also being drivable by the wheels under coast conditions wherein the traction wheels provide the torque, electrical generating means, electric motor means adapted to be connected to the output of the generating means and to deliver torque to the propeller shaft, and an infinitely variable ratio gear-type transmission means incorporating dual planetary members forming two adjacent planetary gearsets, each gearset having planets, a carrier carrying the planets of both gearsets, and coaxial gears which mesh with the planets and about which the planets rotate, said transmission means having two driving portions and having two driven portions providing the respective outputs for the wheel-connected shaft and electrical generating means, one of said driving portions and one of said driven portions being connected to said carrier, the other driving portion being connected to one of the coaxial gears, and the other driven portion being connected to the other coaxial gear, said transmission means further having clutch means effective between certain adjacent members thereof to provide a respective one-way and two-way 1:1 driving connection through the said two gearsets and being effective in that order such that the members of the latter are brought into and maintained in synchronism with one another under coast torque conditions at all times prior to establishment of the two-way connection and in which the wheel-connected shaft tends to overspeed with respect to one or more members of the two gearsets.

10. In an electrical driving system for a motor vehicle or the like incorporating a motor-connected shaft, a generator having a fixed stator and a rotor journalled for rotation relative thereto, and a propeller shaft, a gear-type transmission system having planetary gearset members forming a planetary-differential transmission assembly, said planetary-differential transmission assembly having a first member connected to said motor-connected shaft, a second member connected to said propeller shaft, and a third reaction member establishing cooperation among said just-numbered members so as drivingly to interconnect the same, said reaction member being drivingly connected to the generator rotor to operate the generator, said planetary-differential driving assembly having associated therewith electrical means including the generator and a motor electrically driven thereby connected to said propeller shaft effective to apply a restraining torque to the reaction member, electrical means including the generator and a load electrically driven thereby effective to apply a restraining torque to the reaction member, and a clutch device including an engageable element in the planetary-differential transmission assembly engageable between at least two said members thereof to provide a 1:1 driving connection through the planetary-differential assembly causing rotation, in synchronism with said shafts, of said reaction member notwithstanding opposition from electrical means aforesaid.

11. In an electrical driving system for a motor vehicle or the like incorporating a motor-connected shaft, a generator, and a propeller shaft, a gear-type transmission system having planetary gearset members forming a planetary-differential transmission assembly, said planetary-differential transmission assembly having a first member connected to said motor-connected shaft, a second member connected to said propeller shaft, and a third reaction member establishing cooperation among said just-named members so as drivingly to interconnect the same, said planetary-differential driving assembly having associated therewith electrical means including the generator and a motor electrically driven thereby connected to said propeller shaft effective to apply a restraining torque to the reaction member, electrical means including the generator and a load electrically driven thereby effective to apply a restraining torque to the reaction member, and a one-way clutch including an engageable element in the planetary-differential transmission assembly engageable between at least two said members thereof to provide a one-way 1:1 driving connection through the planetary-differential assembly causing rotation, in synchronism with said shafts, of said reaction member notwithstanding opposition from said last-named electrical means.

12. In an electro-mechanical driving system for engine and electric motor driven vehicles and the like of the type incorporating a planetary differential gearset, a prime mover connected to a first gear-carrying member of the gearset, a pair of manual controls consisting of an engine throttle control and a vehicle brake control, and a propeller shaft connected to a second gear-carrying member of the gearset, an electrical generator unit connected to a gear-carrying member forming the reaction member of the gearset for establishing a geared drive connection between the first and second members such that the generator unit is driveable by the prime mover and by the propeller shaft, electrical connection means including an output circuit, an electric motor unit adapted by means of said electrical connection means for receiving and being driven by electric output from said generator unit, said electric motor unit having a drive connection with said propeller shaft, dynamic braking means including resistor means forming an electric load resistance, electrical switching elements effective for connecting said electric load resistance in the output circuit with one said unit, and a switch-actuating member operatively connected to at least one of said pair of throttle and brake controls and to at least one of said switching elements to actuate the latter to connect the electric load resistance in response to operation of said control.

13. In an electro-mechanical driving system for motor vehicles and the like of the type incorporating a prime mover, a pair of manual controls consisting of a throttle control and a brake control, and a propeller shaft, an electrical generator unit driveable by the prime mover and by the propeller shaft, electrical connection means including an output circuit, an electric motor unit adapted by means of said electrical connection means for receiving and being driven by electric output from said generator unit, said electric motor unit having a drive connection with said propeller shaft, dynamic braking means including a plurality of electric resistance load members, electrical switching elements effective for connecting said load members in the output circuit with one said unit, a switch-actuating member connected to the throttle control and to at least one switching element to connect the resistance load members in series in response to operation of the throttle control and a switch-actuating member operatively connected to said brake control and being effective to short out at least one of said load members and increase the effective load of the latter in response to operation of said brake control.

14. An electrical driving system for a motor vehicle or the like of the type incorporating a prime mover, a plurality of operator-operated controls including a friction brake member, and a propeller shaft, said driving system comprising an electrical generator unit, a transmission assembly comprising planetary-differential gearing members forming a dual planetary gearset system, said transmission assembly having planet means for each gearset, a carrier for carrying the planet means of both gearsets, and coaxial gears which mesh with the planet means of the gearsets and about which the planet means rotate, one of said coaxial gears being connected to said prime mover and the other coaxial gear being connected to said propeller shaft, said carrier being mounted for rotation with said generator unit to provide a geared driving connection between the prime mover and the generator unit, two-way clutch means in the transmission assembly engageable between at least two members thereof to provide 1:1 drive of said prime mover and generator by said propeller shaft, an electric motor unit drivingly connected to said propeller shaft, means including an output circuit adapting said motor unit for electrical connection with said generator unit, dynamic braking means including multi load parts, electrical switching elements establishing cooperation with one another to disconnect one said unit from the other and to connect one or more of said load parts so as to be selectively effective in the output circuit with one said disconnected unit, and a switch-actuating member operatively connected to said friction brake member and to at least one of said switching elements to actuate the latter to connect one or more of said load parts in response to application of friction brake control.

15. In an electro-mechanical driving system for motor vehicles and the like of the type incorporating a prime mover, a pair of manual controls consisting of an engine throttle control and a vehicle brake control, and a propeller shaft: an excited electrical generator unit driveable by the prime mover and by the propeller shaft, electrical connection means including an output circuit, an electric motor unit adapted by means of said electrical connection means for receiving and being driven by electric output from said generator unit, said electric motor unit having a drive connection with said propeller shaft, a source of electrical excitation for the generator unit including an input circuit for the latter, multi-part load means, said output circuit and said input circuit having electrical switching elements therein establishing cooperation with one another to disconnect one said unit from the other and to connect one or more of said load multi-parts so as to be selectively effective in each said input circuit and in said output circuit with one said disconnected unit, and a switch actuating means operatively connected to at least one of said pair of throttle and brake controls and to said switching elements to actuate the latter to connect said load parts in the excitation input circuit for, and in the electric output circuit of, the generator unit in response to operation of said control thereby exciting the generator unit at reduced input-circuit input and reducing the output-circuit output of the generator unit while simultaneously dynamically braking the same under the action of such load parts in the output circuit.

16. In an electro-mechanical driving system for motor vehicles and the like of the type incorporating a prime mover, a pair of manual controls consisting of an engine throttle control and a vehicle brake control, and a propeller shaft: an excited electrical generator unit driveable by the prime mover and by the propeller shaft, electrical connection means including an output circuit, an electric motor unit adapted by means of said electrical connection means for receiving and being driven by electric output from said generator unit, said electric motor unit having a drive connection with said propeller shaft, a source of electrical excitation for the generator unit including an input circuit for the latter, multi-part load means, said output circuit and said input circuit having electrical switching elements therein establishing cooperation with one another to disconnect one said unit from the other and to connect one or more of said load multi-parts so as to be selectively effective in each said input circuit and in said output circuit with one said disconnected unit, and a switch actuating means operatively connected to each of said pair of throttle and brake controls and to said switching elements to actuate the latter to connect said load parts in the excitation input circuit for, and in the electric output circuit of, the generator unit in response to operation of said control thereby exciting the generator unit at reduced input-circuit input and reducing the output-circuit output of the generator unit while simultaneously dynamically braking the same under the action of such load parts in the output circuit.

PAUL T. NIMS.
ALEXANDER CHADKEWICZ,
*Now by change of name Alexander Chadwick.*

References Cited in the file of this patent

UNITED STATES PATENTS

| Number | Name | Date |
|---|---|---|
| 948,436 | Thomas | Feb. 8, 1910 |
| 1,616,658 | Heany | Feb. 8, 1927 |
| 1,870,076 | Thomson | Aug. 2, 1932 |
| 2,025,523 | Neuland | Dec. 24, 1935 |
| 2,050,185 | Kibler | Aug. 4, 1936 |
| 2,355,000 | Liebrecht | Aug. 1, 1944 |
| 2,565,038 | McCurtain | Aug. 21, 1951 |

FOREIGN PATENTS

| Number | Country | Date |
|---|---|---|
| 7,933 | Great Britain | Mar. 12, 1908 |
| 8,367 | Great Britain | of 1907 |
| 19,903 | Great Britain | of 1911 |
| 191,084 | Great Britain | Jan. 31, 1923 |
| 263,160 | Germany | Aug. 1, 1913 |
| 642,766 | France | Sept. 4, 1928 |